United States Patent
Romanenko et al.

(10) Patent No.: US 9,614,867 B2
(45) Date of Patent: *Apr. 4, 2017

(54) SYSTEM AND METHOD FOR DETECTION OF MALWARE ON A USER DEVICE USING CORRECTED ANTIVIRUS RECORDS

(71) Applicant: AO Kaspersky Lab, Moscow (RU)

(72) Inventors: Alexander A. Romanenko, Moscow (RU); Anton S. Lapushkin, Moscow (RU); Oleg A. Ishanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,896

(22) Filed: Apr. 14, 2016

(65) Prior Publication Data

US 2016/0255101 A1    Sep. 1, 2016

Related U.S. Application Data

(63) Continuation of application No. 14/598,425, filed on Jan. 16, 2015, now Pat. No. 9,350,756, and a
(Continued)

(30) Foreign Application Priority Data

Nov. 24, 2011   (RU) ................................ 2011147542

(51) Int. Cl.
G06F 12/16      (2006.01)
H04L 29/06      (2006.01)
G06F 21/56      (2013.01)

(52) U.S. Cl.
CPC ............ H04L 63/145 (2013.01); G06F 21/56 (2013.01); G06F 21/561 (2013.01); G06F 21/568 (2013.01)

(58) Field of Classification Search
USPC ........................................................ 726/24
See application file for complete search history.

(56) References Cited

U.S. PATENT DOCUMENTS 6,269,456 B1   7/2001   Hodges et al.
6,993,660 B1 *  1/2006   Libenzi ................. G06F 21/562
                                                   713/188

(Continued)

FOREIGN PATENT DOCUMENTS

CN         102222192 A      10/2011
WO       2007087141 A1       8/2007

OTHER PUBLICATIONS

European Search Report regarding EP12164873, Jul. 10, 2012, 9 pages.

*Primary Examiner* — Amare F Tabor
(74) *Attorney, Agent, or Firm* — Arent Fox LLP; Michael Fainberg

(57) ABSTRACT

Disclose are system, method and computer program product for detection of malware on a user's computing device. An exemplary method comprises: detecting, by an antivirus application executing of the user's computing device, that an antivirus record is activated on the computing device for detecting a maliciousness of a software object, the antivirus record having a selected status indicator indicating at least one of: a working record, a test record, or an inactive record; in response to detecting the antivirus record having working or test status, checking, by the antivirus application, for a correction of the antivirus record with an antivirus server, wherein said correction includes a change in the status of the antivirus record; in response to receiving from the antivirus server the correction of the antivirus record, using by the antivirus application said correction for processing of the software object.

17 Claims, 6 Drawing Sheets

Related U.S. Application Data continuation of application No. 14/230,262, filed on Mar. 31, 2014, now Pat. No. 8,966,634, which is a continuation of application No. 13/428,177, filed on Mar. 23, 2012, now Pat. No. 8,732,836.

(56) References Cited

U.S. PATENT DOCUMENTS

| | | |
|---|---|---|
| 7,080,000 B1 | 7/2006 | Cambridge |
| 7,363,657 B2 | 4/2008 | Caccavale |
| 7,509,676 B2 | 3/2009 | Trueba |
| 7,640,589 B1 * | 12/2009 | Mashevsky ............ G06F 21/56 726/24 |
| 7,650,639 B2 * | 1/2010 | Kramer ................ G06F 21/562 726/23 |
| 7,743,419 B1 * | 6/2010 | Mashevsky ........... G06F 21/552 713/187 |
| 7,765,410 B2 | 7/2010 | Costea |
| 7,844,700 B2 | 11/2010 | Marinescu |
| 8,087,086 B1 | 12/2011 | Lai et al. |
| 8,214,905 B1 | 7/2012 | Doukhvalov et al. |
| 8,434,152 B2 | 4/2013 | Trueba |
| 8,561,190 B2 * | 10/2013 | Marinescu ............ G06F 21/56 713/188 |
| 8,584,240 B1 | 11/2013 | Yang |
| 8,832,836 B2 * | 9/2014 | Thomas ................ G06F 21/566 726/24 |
| 2004/0068662 A1 | 4/2004 | Ho et al. |
| 2005/0091512 A1 | 4/2005 | Shipp |
| 2007/0277167 A1 | 11/2007 | Smith et al. |
| 2009/0138972 A1 | 5/2009 | Scales |
| 2010/0132042 A1 | 5/2010 | Zhang |
| 2011/0126286 A1 | 5/2011 | Nazarov |
| 2011/0173698 A1 | 7/2011 | Polyakov et al. |
| 2011/0197280 A1 | 8/2011 | Young et al. |
| 2012/0017275 A1 | 1/2012 | Harmonen |
| 2012/0066759 A1 * | 3/2012 | Chen .................... G06F 21/554 726/15 |
| 2012/0084865 A1 | 4/2012 | Niemela |
| 2012/0159631 A1 * | 6/2012 | Niemela ............... G06F 21/565 726/24 |
| 2012/0159633 A1 | 6/2012 | Grachev et al. |
| 2012/0174224 A1 * | 7/2012 | Thomas ................ G06F 21/566 726/24 |
| 2013/0074159 A1 | 3/2013 | Lin et al. |
| 2014/0137253 A1 * | 5/2014 | Kasslin .................. G06F 21/56 726/24 |

* cited by examiner

SYSTEM AND METHOD FOR DETECTION OF MALWARE ON A USER DEVICE USING CORRECTED ANTIVIRUS RECORDS

CROSS-REFERENCE TO RELATED APPLICATIONS

This application is a continuation of U.S. patent application Ser. No. 14/598,425 filed Jan. 16, 2015, which is a continuation of U.S. patent application Ser. No. 14/230,262 filed Mar. 31, 2014, which is a continuation of U.S. patent application Ser. No. 13/428,177 filed Mar. 23, 2012, which claims benefit of priority under 35 U.S.C. 119(a)-(d) to a Russian Patent Application No. 2011147542 filed Nov. 24, 2011, all of which are incorporated by reference herein.

TECHNICAL FIELD

The present disclosure generally relates to the field of computer security, and specifically to systems, methods and computer program products for correcting antivirus records.

BACKGROUND

Currently, one of the most pressing problems in the antivirus industry is the issue of keeping antivirus databases up to date. In fact, even in the short time in which a malware program has not yet been detected by the leading antivirus experts and companies, it can be downloaded hundreds of thousands of times by different users and can infect a great number of computers. Timely updating of antivirus databases permits the combat against malware to be adequately and rapidly carried out.

But it is worth noting that the quantity of software, including malware, is constantly increasing, in which connection proactive methods of detecting similar applications are necessary. To combat unknown malware, modern antivirus companies are employing the methods of heuristic analysis, the execution of unknown programs in a protected environment (e.g., sandbox, honeypot) with the use of virtualization, and various means of limiting the functionality of programs based on an analysis of their activity (e.g., HIPS). Nevertheless, one cannot totally rely on all of the procedures enumerated above, since they possess definite deficiencies associated with both the specifics of their operation and their use in current antivirus applications in which the user has the right to establish settings that do not offer the full use of these technologies since they can take up a considerable amount of time and resources, for example when launching unknown programs. Before verification of unknown programs is completed, a user can, for example, disable their execution in a protective environment in the form of a sandbox, or else reduce the time that is allocated to emulation.

In connection with the possible risks of inefficient operation of proactive technologies, and in view of the constant increase in the number of malware programs, so-called "whitelists" have become more and more popular: databases of clean, i.e., verified and reliable, objects. A list of clean objects is constructed for files, applications, links, and e-mail messages, as well as for user-account records on instant-messaging systems, message-exchange logs, IP addresses, host names, domain names, and so forth. It is possible to compile similar lists starting from many factors: the presence of an electronic signature or other manufacturer data, data about the source (where the application was obtained), data about application links (parent-child relationships), data on the application version (e.g., an application can be considered verified, proceeding from the fact that the previous version was also in the list of verified programs), data on environmental variables (e.g., operating system, startup parameters), etc. Before each release of updates to signatures for antivirus databases, they must be checked against collisions for example, with the "whitelist" of files. It is worth noting that the majority of unknown executable files under study at a given time are so-called PE (Portable Executable) files and they have the PE format (for the Windows family of operating systems, under which most malware is written). A PE file can be represented in the form of a header, a certain number of sections that comprise the form of an executable program, and an overlay, which is a program segment loadable as needed during execution. At the present time, various unique parts of the file are being used in an attempt to create a file signature. Most often, code from a section of code is used for these purposes. However, situations are not unusual in which an expert will erroneously interpret a library or other widely used code as part of malware because this fragment is present in malware. In this case, a signature may be created that is erroneously applied to this widely used fragment. This signature will successfully detect a malware application, but this signature will also define as malicious all other files that contain this code fragment but are clean. As a result of this error, a false detection takes place.

The operation of antivirus applications is, one way or another, associated with some antivirus records for example, rules, templates, lists, and signatures, in the creation of which an expert generally participates, as a rule. These antivirus records permit malware to be detected and removed. But the human factor is also not excluded in this process, and an expert can make a mistake, for example, after creating a signature that will determine to be malicious some clean software, information about which is in a "whitelist" of files. It must also be noted that it is not just the expert who can make a mistake. Systems exist for the automatic development of antivirus records, which, in attempting to detect as much malware as possible, will inevitably also encompass some clean applications.

Accordingly, a need arises for a method for correcting antivirus records contained in antivirus databases in order to minimize false malware detections.

SUMMARY

Disclose are system, method and computer program product for detection of malware on a user's computing device. An exemplary method comprises: detecting, by an antivirus application executing of the user's computing device, that an antivirus record is activated on the computing device for detecting a maliciousness of a software object, the antivirus record having a selected status indicator indicating at least one of: a working record, a test record, or an inactive record; in response to detecting the antivirus record having working or test status, checking, by the antivirus application, for a correction of the antivirus record with an antivirus server, wherein said correction includes a change in the status of the antivirus record; in response to receiving from the antivirus server the correction of the antivirus record, using by the antivirus application said correction for processing of the software object comprising: upon detecting the status being changed to the inactive record, avoiding generating notifications to the user for indicating the software object is malicious and blocking subsequent transmissions of collected statistical information relating to the software object to the antivirus server.

In one exemplary aspect, the method further comprising: in response to receiving from the antivirus server a notification of no change of the status of the antivirus record, transmitting information relating to the antivirus record from the computing device to the antivirus server for at least performing an antivirus check of the software object, the information including a unique identifier of the antivirus record and statistical information of the software object collected during an activation of the antivirus record.

In one exemplary aspect, the unique identifier of the antivirus record is obtained from an antivirus database of the computing device.

In one exemplary aspect, performing the antivirus check of the software object comprises: comparing the received information relating to the antivirus record with information relating to known clean software objects stored in a second database; and using statistical information about software objects and associated antivirus records collected from a plurality of antivirus applications deployed on different computing devices to determine the correction of status of the antivirus record.

In one exemplary aspect, the method further comprising determining a record correction rule to be applied to the antivirus record based on the statistical information in determining the correction of status of the antivirus record.

In one exemplary aspect, the record correction rule is activated to change a status of the antivirus record upon detecting an amount of received statistical information exceeding a selected threshold.

In one exemplary aspect, the statistical information of the software object collected during the activation of the antivirus record include one or more of: a name of the software object, a hash sum of the software object, a version of the software object, and access permissions of the software object.

In one exemplary aspect, a system for detection of malware on a user's computing device comprises a hardware processor of a user's computing device configured to: detect, by an antivirus application executing of the user's computing device, that an antivirus record is activated on the computing device for detecting a maliciousness of a software object, the antivirus record having a selected status indicator indicating at least one of: a working record, a test record, or an inactive record; in response to detecting the antivirus record having working or test status, checking, by the antivirus application, for a correction of the antivirus record with an antivirus server, wherein said correction includes a change in the status of the antivirus record; in response to receiving from the antivirus server the correction of the antivirus record, using by the antivirus application said correction for processing of the software object comprising: upon detecting the status being changed to the inactive record, avoiding generating notifications to the user for indicating the software object is malicious and blocking subsequent transmissions of collected statistical information relating to the software object to the antivirus server.

In one exemplary aspect, a non-transitory computer-readable storage medium comprising computer-executable instructions for: detecting, by an antivirus application executing of the user's computing device, that an antivirus record is activated on the computing device for detecting a maliciousness of a software object, the antivirus record having a selected status indicator indicating at least one of: a working record, a test record, or an inactive record; in response to detecting the antivirus record having working or test status, checking, by the antivirus application, for a correction of the antivirus record with an antivirus server, wherein said correction includes a change in the status of the antivirus record; in response to receiving from the antivirus server the correction of the antivirus record, using by the antivirus application said correction for processing of the software object comprising: upon detecting the status being changed to the inactive record, avoiding generating notifications to the user for indicating the software object is malicious and blocking subsequent transmissions of collected statistical information relating to the software object to the antivirus server.

The above simplified summary of example aspect(s) serves to provide a basic understanding of the invention. This summary is not an extensive overview of all contemplated aspects of the invention, and is intended to neither identify key or critical elements of all aspects nor delineate the scope of any or all aspects. Its sole purpose is to preset one or more aspects in a simplified form as a prelude to the more detailed description of the invention that follows. To the accomplishment of the foregoing, the one or more aspects comprise the features described and particularly pointed out in the claims.

BRIEF DESCRIPTION OF THE DRAWINGS

The accompanying drawings, which are incorporated into and constitute a part of this specification, illustrate one or more example aspects of the invention and, together with the detailed description serve to explain their principles and implementations.

In the drawings.

DETAILED DESCRIPTION

Example aspects of the present invention are described herein in the context of systems, methods and computer program products for minimizing false positives during detection of malware by timely updating of antivirus databases with corrected antivirus records. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects of the invention as illustrated in the accompanying drawings. The same reference indicators will be used to the extent possible throughout the drawings and the following description to refer to the same or like items.

Figure 1:
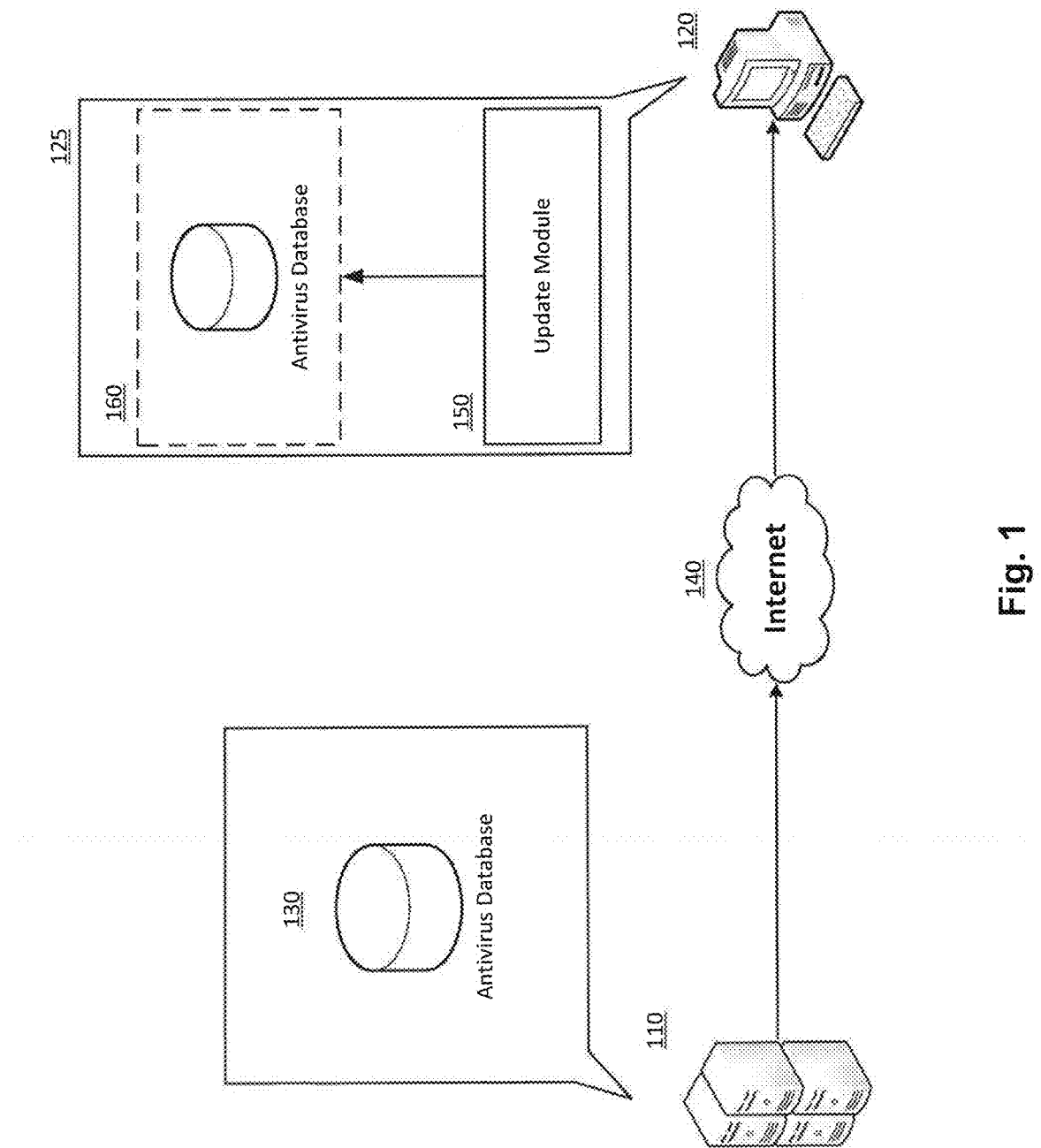
FIG. 1 illustrates a schematic diagram of a system for updating antivirus databases.

FIG. 1 shows an example system for updating antivirus databases. Generally, antivirus updates are directed from an update server 110 through the Internet 140 to a PC 120 that runs an antivirus application 125. The server 110 maintains an antivirus database 130, which is constantly supplemented by the antivirus company with new and updated antivirus records. Hence, the antivirus company is constantly releasing new signatures, heuristics, methods of parental control, and other objects, which it can release in two status groups, both those antivirus records already verified and working and test antivirus records that can be checked on user computer in test mode. In one example aspect, the antivirus database 130 contains both verified working and test records. Working antivirus records (e.g., signatures, heuristics, and others) differ from test records in the fact that if a working record is activated, it produces a user notification of the event. If a test record is activated, then the user will not be notified. Thus, here and hereinafter the term "working record" will be understood to be an antivirus record with "working" status, and the term "test record" will be understood to be an antivirus record with "test" status. It must be noted that system operation is not limited to the use of antivirus records with the indicated statuses, and there may be other statuses.

During an antivirus update, new antivirus records from the antivirus database 130 are transmitted via the Internet 140 to the PC 120. On the PC 120 is installed an antivirus application 125 that contains an update module 150, to which records are transmitted from the antivirus database 130. The antivirus application 125 has its own antivirus databases 160, in which both working and test records are stored. The antivirus database 160 can be used by one of the analytical modules of the antivirus application; this could be a signature verification module, an emulator, a means of heuristic verification, and others. New records from the antivirus database 130, having a relationship to both working records and test records, are transmitted by the update module 150 into the antivirus database 160.

Each record found in the antivirus database 160 possesses a unique identifier (ID). Each antivirus record allows detection of one or several malicious objects, each possessing its own hash sum. It must be noted that hash sums are often calculated using the MD5 algorithm, but they can also be calculated using any other hash functions, for example, MD4, SHA1, SHA2, SHA256, and so forth. The relationship between the unique identifier of an antivirus record and the hash sum of objects is "many-to-many". For example, one record with a unique identifier can be associated with several hash sums. At the same time, one hash sum can correspond to several records. This can occur, for example, if a separate record with a unique identifier was first applied to a specific hash sum, and then a new record was created allowing detection of the entire family of similar malware programs.

It should be noted that the process of this antivirus updating can occur on an hourly interval. If, after an antivirus update to the antivirus base 160, there arrives a signature, for example, using which an object that is known to be clean is determined to be malicious, then a similar event is a false reading and leads to a false notification. Over several hours, up until the next antivirus update when such an error can be corrected, a false reading may occur on an immense number of PCs 120, and an immense number of users will be informed of the detection of a clean object as malicious. A mechanism is therefore necessary that permits timely correction of antivirus records before the basic update of antivirus databases, with the goal of minimizing false readings as well as false notifications.

Figure 2:
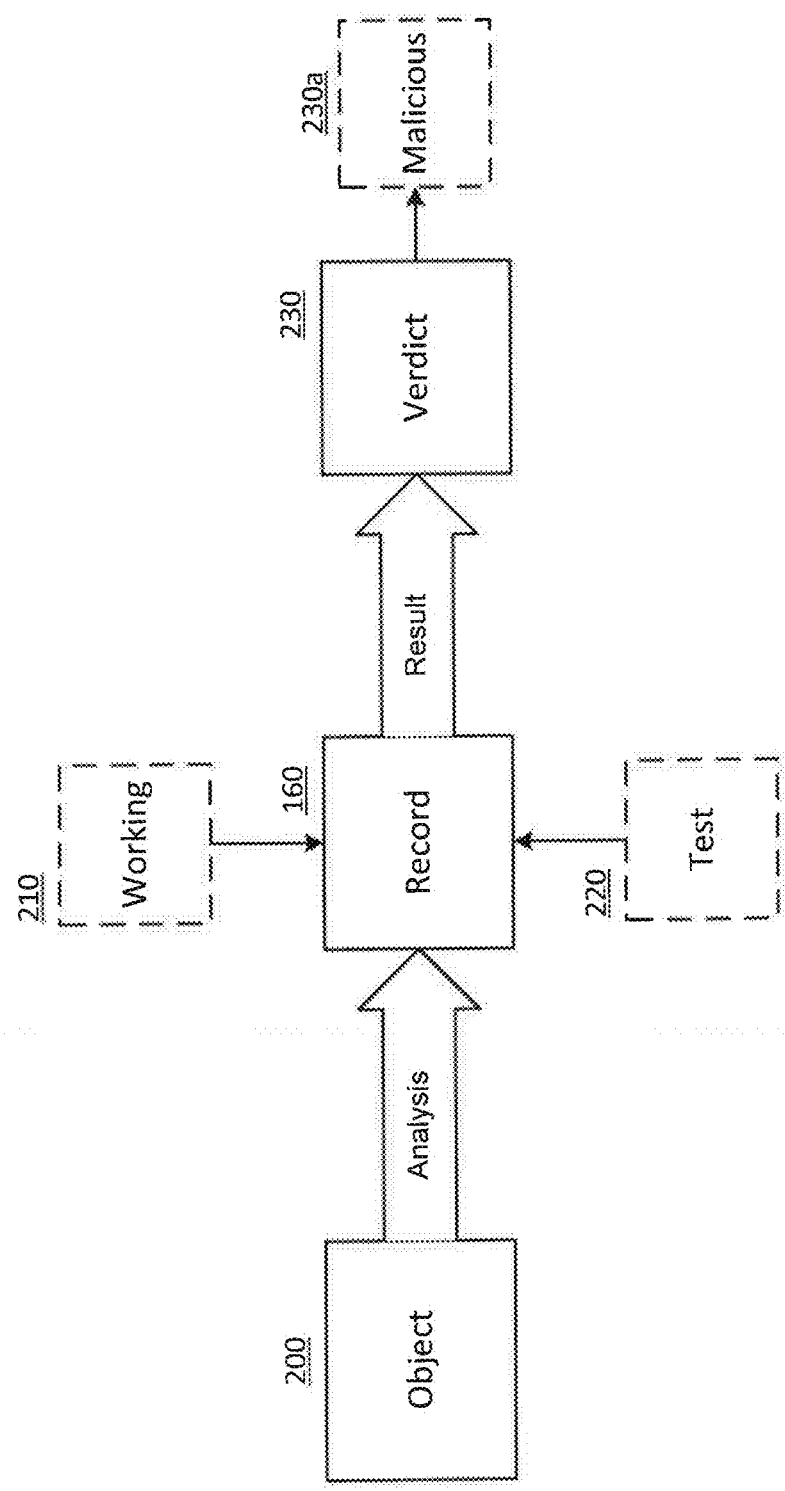
FIG. 2 illustrates a mechanism of antivirus verification.

FIG. 2 depicts the mechanism of antivirus verification by the antivirus application 125 deployed on a PC 120. An antivirus database 160 contains working antivirus records 210 and test records 220. Each antivirus record may have its own unique identifier. During antivirus verification of a specific object 200, the antivirus application can use any record with a unique identifier from the antivirus database 160. Each record from the antivirus database 160 renders a verdict 230 on the results of the verification. The antivirus database 160 contains records that permit an antivirus application to detect a malicious object 200, and to subsequently carry out a series of actions designed to neutralize this object 200. Thus, when an antivirus application 125 analyzes an object 200 using a record from the antivirus database 160, the verdict 230 for this object 200 will, on the basis of the activated record, may identify the object 200 as malicious object 230*a*. But there is a probability that this record and the verdict on it are not accurate, because, for example, an antivirus record used by the antivirus application 125 may identify object 200 as a malicious even though this object is in fact clean. It is therefore necessary to have a tool for verifying the validity of records used by antivirus applications as well as the timely correction of invalid antivirus records.

Figure 3:
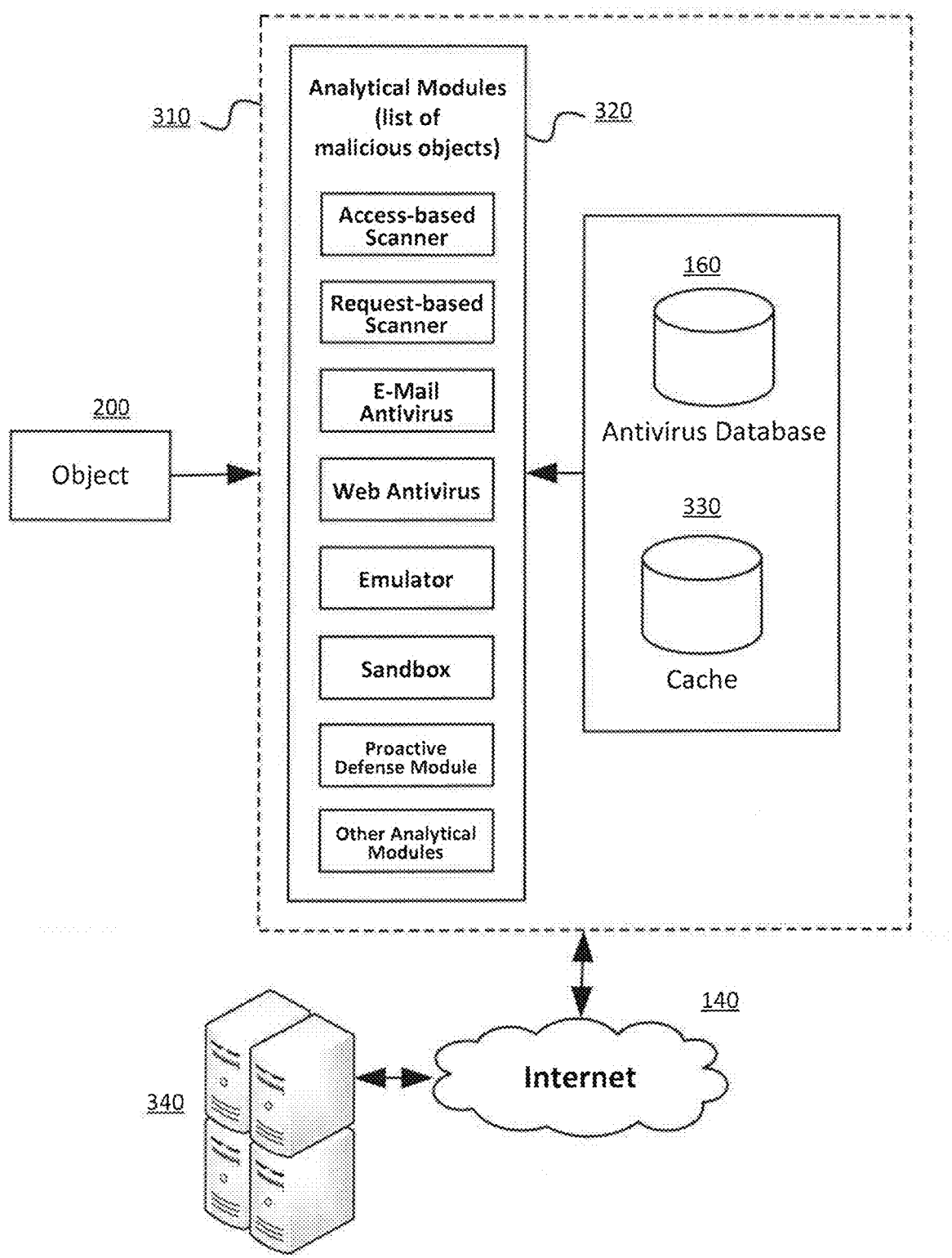
FIG. 3 illustrates a client-server system for protecting against malware according to one example aspect.

FIG. 3 depicts a system for protection of a PC against malware in accordance with one example aspect. A system for protection against malware includes an antivirus application 310 which contains a number of analytical modules 320 permitting detection and, for example, removal, of malware. For the operation of the analytical modules 320, the antivirus application 310 maintains its own antivirus database 160, which contains both working records 210 and test records 220. Each antivirus record has its own unique identifier. During antivirus verification of a specific object 200, any analytical module from a series of analytical modules 320 can use records from the antivirus database 160. These records are, for example, signatures, heuristics, means of parental control, and others. It must be noted that not all analytical modules from the series of analytical modules 320 use the same record. Depending on the type of object 200 an appropriate analytical module is used which employs antivirus records to verify this object 200. Several analytical modules can also jointly execute verification of the object 200. Any analytical module from the series of analytical modules 320 for an antivirus check of a specific object 200 can use both a working record 210, activation of which may trigger a user notification, and a test record 220, activation of which does not trigger user notification. The antivirus application 310 can also contain a cache 330, necessary for storing corrections to the antivirus records. Corrections, for example, corrected records or the status of records that are located in the cache 330 have higher priority compared to records with the same identifier from the antivirus database 160. If, during an antivirus check of object 200 using some analytical module, there exists the possibility of using a record for this object 200 from the antivirus database 160 or an record with the same identifier from the cache 330, then this analytical module will select the record from the cache 330.

If an antivirus record is activated as both working and test, information on the activated record is sent to the analysis and correction server 340, on which the validity of the activated record can be verified. Information about the object 200 detected by the record can also be sent to the analysis and correction server 340. This information is necessary to identify those records in the antivirus database 160, whose functioning leads to the occurrence of false detections and user notifications. Information on the objects 200 detected by the records can be presented in the form of the metadata for these objects 200. The analysis and correction server 340 may be hosted by the company supplier of antivirus services and it receives statistical information on activated antivirus records and on objects 200 detected by these records, from a number of PCs 120 on which antivirus applications 310 are deployed. Communication between the antivirus applications 310 and the analysis and correction server 340 is through the Internet 140. If, during the operation, some analytical module from the series of analytical modules 320 activates an antivirus record from the antivirus base 160, then this module is configured to send a query to the analysis and correction server 340 for the purpose of checking the validity of the activated record. This query is made before any actions are performed with the activated record. So, for example, a query will be sent before a notification is produced regarding the detection of a malicious object by an activated record having "working" status. If the response to the query confirms the validity of the activated record, then a notification ensues, as well as further actions directed toward neutralizing the malicious object 200 are performed. The detection and correction of the antivirus records, which result in false detections and user notifications, are performed during processing of the statistical information associated with objects 200 detected using these records.

Figure 4:
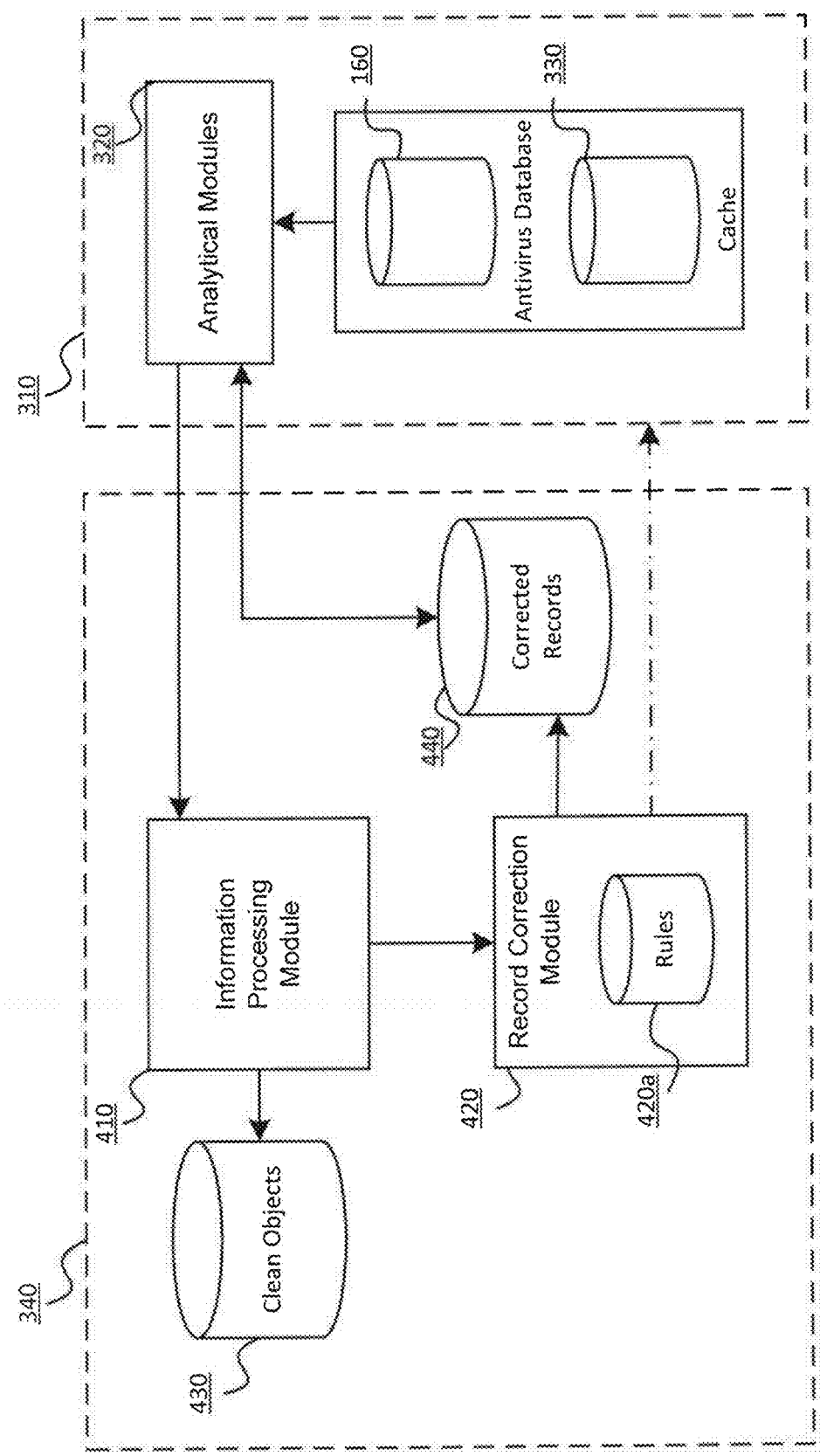
FIG. 4 illustrates a schematic diagram of the system for timely correction of antivirus records according to one example aspect.

FIG. 4 depicts a system for the timely correction of antivirus records with the goal of minimizing false detections in accordance with one example aspect. As was noted earlier, an antivirus application 310 installed on a PC 120 interacts with the analysis and correction server 340 during its operation. So, for example, when a unique antivirus record is activated, either working or test, information about the activated record is sent to the analysis and correction server 340, on which a check of the validity of the activated record is performed. In one of the aspects, the analysis and correction server 340 contains a database of corrected records 440 which stores the corrections for those records that were recognized during prior analysis as responsible for false detections. For example, information relating to corrections of status for antivirus records is stored in this database 440. This very case will be described further in a description of an example aspect. But it must be understood that the system being described is not limited to the described example aspects, and a database of corrected records 440 may also contain completely altered antivirus records.

In the general case, during an antivirus check of a specific object 200, any analytical module from the series of analytical modules 320 can use records from the antivirus database 160. Furthermore, if any analytical module from the series of analytical modules 320 has determined the maliciousness of an object 200 using a specific antivirus record, then before executing any actions in accordance with the activated record, such as issuing a user notification of this event, this analytical module will send a query to the analysis and correction server 340, and specifically to the database of corrected records 440. In the query, for example, the identifier will be indicated for the activated antivirus record from the antivirus database 160. If the record with this identifier was corrected before the next update of the antivirus database 160, for example, its status was changed, and this correction, which in this case is information on the new status, is found in the correction database 440, then in response to the query on the part of the antivirus application 310, for example, to any analytical module from the series of analytical modules 320, information will be transmitted about correcting the status of the activated antivirus record. Further operation of the antivirus application 310, and specifically of any analytical module from the series of analytical modules 320, with the object 200 will be carried out in accordance with the changed status for the activated antivirus record. In a particular case, information on corrections for records can be transmitted from any analytical module from the series of analytical modules 320 to the cache 330, which is necessary for storing corrections to antivirus records. Corrections that are found in the cache 330 are always used in an antivirus check of a specific object 200. Thus, for example, in activating a specific record from the antivirus database 160, the presence of a correction for this record will be first checked in the cache 330. If there is a correction in the cache 330, for example, a change in the status of the activated antivirus record, then the operation of the antivirus application, and specifically of any analytical module from the series of analytical modules 320, will be executed in accordance with the changed status for the activated antivirus record. In a particular case, if, as a result of a query to the database of corrected records 440, any analytical module from the series of analytical modules 320 has received a completely changed antivirus record and has saved it in the cache 330, then upon further operation, this record specifically will have higher priority compared to records from the antivirus database 160. That is, if during an antivirus analysis of a specific object 200 by any analytical module from the series of analytical modules 320, there is an option of using antivirus records associated with object 200 from the antivirus database 160 and from the cache 330, then this analytical module will select an record from the cache 330. It must be noted that the cache 330 is cleared after the next update of the antivirus database 160, since updated antivirus records that take account of the corrections that have occurred will be transmitted to the antivirus database 160 at the next update.

As indicated above, in one example aspect, the status of an antivirus record may be "working", "test" or "inactive". When activating a "working" record, a user receives a notification on this event; when activating a "test" record, notification does not occur. If a record that has both working and test statutes is activate, information is sent to the analysis and correction server 340 on the record activated, its identifier, for example, and statistical information about the object 200, during whose check this antivirus record was activated. When an "inactive" record is activated, none of the actions described above is performed. The necessity for an "inactive" status follows from several considerations. In the first place, the change of any record to "inactive" status allows false detection and user notifications to be avoided. In addition, when any record from the antivirus database 160 begins to define as malicious an object 200 that is clean and installed on the majority of PCs 120 in the world, for example, such object as Microsoft Word software, an enormous amount of statistical data about this object 200 will be sent to the analysis and correction server 340. Such a stream of statistical data may overload the server 340. Timely change of this record's status to the "inactive" on the server 340 permits blocking of subsequent transmission of statistical data.

If there is no information in the database of corrected records 440 or in the cache 330 regarding corrections to the activated record, then, depending on the record's status, a notification may be transmitted to the user about detection of a malicious object 200. Information on the activated antivirus record, for example, its identifier together with statistical information about the object 200 that activated this record, may also be sent to the analysis and correction server 340, and specifically to an information-processing module 410. It must be noted that the set of statistical data about the object 200 is always sent along with information on the record activated during an antivirus check of this object 200 by some analytical module from the series of analytical modules 320 of the antivirus application 310. The set of statistical data may include different parameters for example, the name of the object 200, the hash sum of this object 200, the version, permissions, and so forth. The analysis and correction server 340 may also maintain a clean-object database 430, which includes known clean objects, such as files, links, and e-mail messages, as well as user-account records for instant messaging communications, message-exchange logs, IP addresses, host names, domain names, advertising company identifiers, and so forth. A sample aspect described herein below, the clean-object database 430 contains the hash sums of objects recognized as trusted and not presenting threats to a PC 120 or to data that is stored on this PC 120. It must be noted that the system is not limited just to the given sample aspect, and there may be a large quantity of data that can be stored in the clean-object database 430.

After receiving information on the antivirus record that was activated, such as, its identifier, as well as statistical information on the object 200, whose analysis triggered activation of the antivirus record, the information-processing module 410 performs a comparison of the information received with the information stored in the clean-object database 430. Thus, in one example aspect, the hash sum of the object 200, which was checked by some analytical module from the series of analytical modules 320 of the antivirus application 310, for which an antivirus record was activated and which was recognized as malicious can be compared to hash sums of clean objects that are stored in the clean-object database 430. If the hash sum of the object 200, checked by some analytical module from the series of analytical modules 320 using an antivirus record and recognized as malicious, coincides with the hash sum of a clean object from the clean-object database 430, then the information-processing module 410 sends information from the clean-object database 430 on the record that evaluated the object as malicious, e.g., its identifier, to the record-correction module 420.

The record correction module 420 is designed to process information on antivirus records that operate incorrectly and determine as malicious clean objects from database 430, as well as to make corrections to these records, for example, to their status. The record-corrections module 420 contains a database of rules 420a, during whose activation the incorrect antivirus record will be corrected by the analysis and correction module 420. So, for example, there can be a rule in the rules database 420a that prescribes module 420 to correct the status from "working" to "inactive" of a record of object 200, whose hash sum is found in the clean-object database 430, if the object 200 is considered to be malicious on fifty PCs 120. For example, considering that several objects 200 can also be recognized as malicious by one antivirus record, a rule that prescribes the correction of an record status from "working" to "inactive" can be activated at a specified value threshold of the ratio between the determination by the antivirus record of an object as malicious when it isn't, and the determination by the same record of an actually malicious object. If this ratio exceeds a pre-set threshold, for example 0.01%, then the status of this antivirus record will be changed by the record-correction module 420 from "working" to "inactive". Similarly, a record with "working" status can be changed to "test" status and vice-versa. For example, if the value of the ratio between the determination by this record of an actually malicious object and the determination by the same record of a clean object as malicious, corresponds to 99.9%, then the status of this antivirus record may be changed by the record correction module 420 from "test" to "working". However, if the value of this ratio drops to a value of, for instance, 90% or lower, then the status of this antivirus record will be changed by the record-correction module 420 from "test" to "inactive". Furthermore, the new status for the antivirus record will be sent along with this record's identifier to the database of corrected records 440. In one example aspect, as soon as the rule for correcting the record status is activated and the record status is changed, the record-correction module 420 can execute a transfer of information about the corrected status of any antivirus record to the cache 330 of antivirus applications 310 on a number of PCs 120, using, for example, PUSH-update technology. PUSH-update technology is a technology for mandatory updating. That is, instead of an antivirus application 310 checking an update server 110 every few minutes for the presence of updates, the server 110 automatically transmits updates to the antivirus application 310 as soon as they become available on the server.

Thus, the described system performs detection of incorrect antivirus records used by antivirus applications 310, corrects status of these records, and transfers the corrections to the records either to the database of corrected records 440 or using PUSH-update technology to the cache 330 of the antivirus applications 310 installed on a number of PCs 120.

In one example aspect, human analysts can be involved in the analysis of antivirus records received by the record correction module 420. Analysts may be responsible for filling the rules database 420a with new rules, based on which an antivirus record will be changed. Analysts can also fill the corrected record database 440 with information on the new status of various records, as well as completely changed antivirus records.

Figure 5:
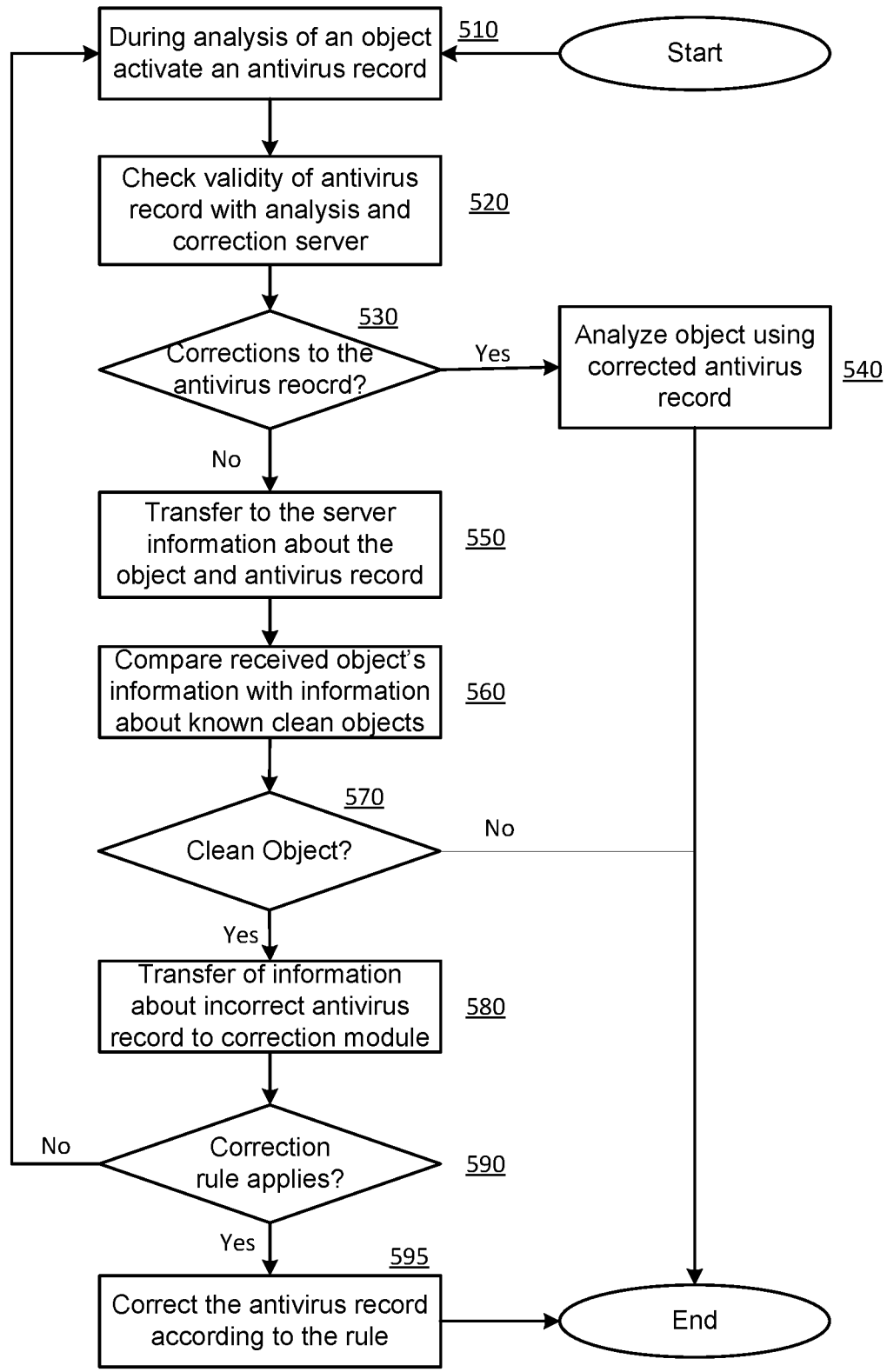
FIG. 5 illustrates a method for the operation of a system for timely correction of antivirus records according to one example aspect.

FIG. 5 depicts a method for the operation of a system for the timely correction of antivirus records, with the goal of minimizing false malware detections. Operation of the system begins at step 510, at which a unique antivirus record from the antivirus database 160 is activated during an antivirus check of an object 200 by some analytical module from the series of analytical modules 320 of an antivirus application 310. The activated record possesses a unique identifier, as well as a status, for example, "working", "test", or "inactive".

Then at step 520 before performing any actions on the object 200 that was determined by an antivirus record to be malicious, for example, notifying the user that such an object was detected on the PC 120, some analytical module from the series of analytical modules 320 queries the analysis and correction server 340, and specifically the corrected-record database 440, for the purpose of establishing the validity of the activated record. For example, the identifier of the activated antivirus record is indicated in the query. Then, at step 530, if the record with this identifier was corrected before the next update, for example, its status was changed, and this correction, which in this case is information on the new status, is found in the correction database 440, then, at step 540, information regarding the correction of the status of the activated record will be transmitted in the response to the query to the antivirus application 310, for example, to some analytical module from the series of analytical modules 320. Further the antivirus application 310, and specifically of some analytical module from the series of analytical modules 320, will use the corrected record to analyzed the object 200 for presence of malware or perform other actions associated with the updated status of the antivirus record. For example, depending on the new status of the record, notification of the detection of a malicious object 200 may be sent to the user if, for example, the status of an antivirus record was changed from "test" to "working". On the other hand, there may be no notification if a record's status was changed to an "inactive" record, for example. The operation of the system may then end after step 540.

In one example aspect, the operation of the system might not conclude after step 540, but continue to step 550. As was stated previously, one antivirus record may detect several objects 200 as malicious. During system operation, a situation may arise in which a new object 200 may appear, for example, a set-up file for a new application which belongs to the "clean" objects, and an antivirus record whose status was previously corrected from "test" to "working" has begun to define this object as malicious. Extending the operation of the system after step 540 to step 550 helps avoid such situations, i.e., false positive detections, that is, the risk of the repeat occurrence of false detection after correcting the antivirus record, for example, its status.

In one example aspect, at step 540, information about the correction of a record is transmitted from some analytical module from the series of analytical modules 320 to the cache 330, which is necessary for storing these corrections to the antivirus records. Corrections that are found in the cache 330 are always used in an antivirus check of some object 200. Thus, for example, when activating some record from the antivirus database 160, the presence of a correction to this record in the cache 330 will be checked. If there is a correction in the cache 330, for example, a change in status of an antivirus record, then the operation of an antivirus application 310, and specifically of some analytical module from the series of analytical modules 320, will be performed in accordance with the corrected status for the activated record. It must also be noted that in a particular aspect, when the record corrections are transmitted from the record correction module 420 directly to the cache 330, at step 520, some analytical module from the series of analytical modules 320 will query not the analysis and correction server 340 but the cache 330 of the antivirus application 310.

And if, at step 530, a record with a given identifier has not been changed before a basic update, and there is no information in the correction database 440 regarding a correction to this record, then the operation of the system continues at step 550. At this step, some analytical module from the series of analytical modules 320, transfers information about the activated record, for example, its identifier, and statistical information about the object 200 during whose analysis this antivirus record was activated, to the analysis and correction server 340, and specifically to the information-processing module 410. The set of statistical data may include various parameters, such as the name of the object 200, a hash sum, the version, permissions, and so forth. On the analysis and corrections server side 340, there is also a clean-object database 430. After receiving information about the activated record, for example, its identifier as well as statistical information about the object 200, during whose antivirus check this record was activated, the information-processing module 410 performs, at step 560, a comparison of the information received with the information stored in the clean object database 430. Hence, in one example aspect, information on the hash sum of a checked object 200 for which the antivirus record was activated, and which was recognized as malicious, can be compared with information on the hash sums of the clean objects that are stored in the clean object database 430. In a particular aspect, other information about the checked object 200, for example, its name can be compared with corresponding information from the clean object database 430. A comparison can also be made between information on a plurality of the parameters of the checked object 200 with corresponding information from the clean-object database 430.

Furthermore, if, at step 570, after comparing the information on the hash sum of the checked object 200 for which the antivirus record was activated and which was recognized as malicious with the information on the hash sums of clean objects that is stored in the clean-object database 430, it is established that the object is in fact malicious, since the clean object database 430 lacks the hash sum of this object, then system operation concludes. However, if at step 570 it is determined that the hash sum of the object 200, checked by some analytical module from the series of analytical modules 320 using an antivirus record and determined to be malicious, matches the hash sum of a clean object from the clean object database 430, then at step 580 the information processing module 410 sends information on the antivirus record that determined the object to be malicious to the record-correction module 420. Such information can be, for example, the identifier of this antivirus record. The record-correction module 420 contains a database of rules 420a, during whose activation by the record correction module 420 some antivirus record will be corrected, for example, its status. Thus if, at step 590, after receiving information on an antivirus record that determined the object 200 to be malicious, information on which is in the clean-object database, and the rule for correcting this record was not activated, then system operation returns to step 510. Similar result may occur, if the record-correction module 420 has received information on this record an insufficient number of times, and the number of cases of incorrect activating of the record is insufficient to activate the rule for correcting this record. It must be understood that, in this case, the commencement of system operation at step 510 for another PC 120 is being kept in mind, on which the same antivirus record was activated during a check of the same object 200.

However, if at step 590, after receiving information on an antivirus record that determined an object to be malicious whose hash sum is in the clean object database 430, and a rule was activated to correct this record, then system operation continues at step 595. At this step, the record correction module 420 will produce a correction of the antivirus record, for example, for the status of this record. The status of an antivirus record can be changed by the record-correction module 420, for example, from "working" to "inactive". Furthermore, the new status for the antivirus record, together with the identifier for this record, is sent to the database of corrected records 440. In one example aspect, as soon as the rule is activated to correct the status of a record and the record status is changed, the record-correction module 420 can execute the transfer of information about the corrected status of any antivirus record to the cache 330 of antivirus applications 310 installed on a plurality of PCs 120 using, for example, PUSH-update technology. Thus, a record correction, for example, its status, will be transmitted either to the database of corrected records 440 or to the cache 330 of the antivirus application 310. After this, with the activation of the same record from the antivirus database 160 during the operation of any analytical module from the series of analytical modules 320 on another PC 120, and the transmission of a query to either the database of corrected records 440 or the cache 330, information will be received about the correction of the antivirus record, for example, the new status, which will be used by the analytical module from the series of analytical modules 320 for analysis of objects.

Figure 6:
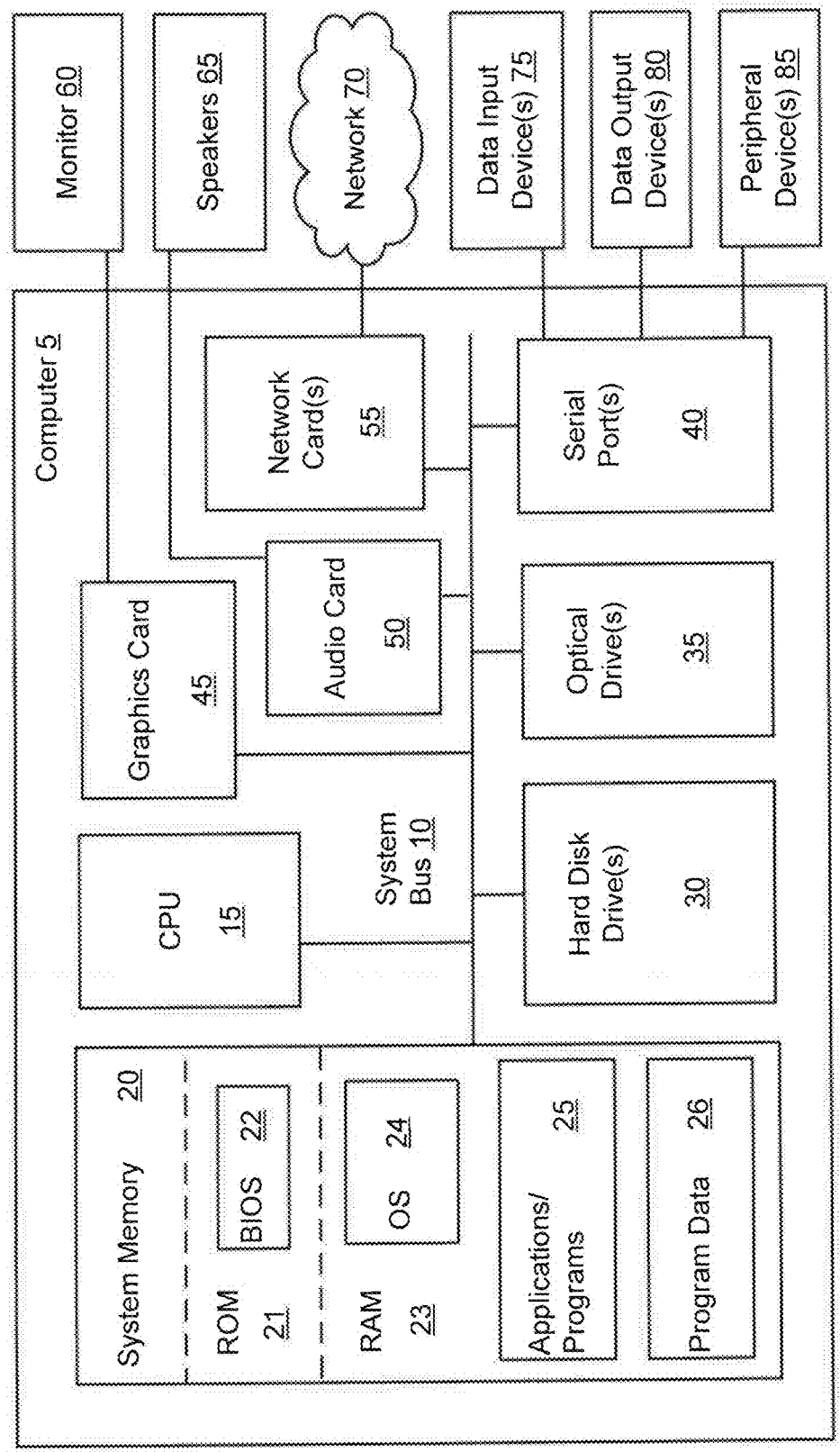
FIG. 6 illustrates a schematic diagram of a computer system according to one example aspect.

FIG. 6 depicts an example aspect of a computer system 5 on which the above-described system for malware detection may be implemented. The system 5 may include a network server, a personal computer, a notebook, a tablet, a smart phone or other types of data processing or computing devices. Computer 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP or other type of operating system, that is responsible for management and coordination of processes and allocation and sharing of hardware resources in computer system 5. System memory 20 also stores applications and programs 25, such as an antivirus application. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the aspects are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for malware detection on a user's computing device, the method comprising:
   detecting, by an antivirus application executing on the user's computing device, that an antivirus record is activated on the computing device for detecting a maliciousness of a software object, the antivirus record having a selected status indicator indicating at least one of: a working record, a test record, or an inactive record;
   in response to detecting the antivirus record having working or test status, checking, by the antivirus application, for a correction of the antivirus record with a server, wherein said correction includes a change in the status of the antivirus record;
   in response to receiving from the server the correction of the antivirus record, using by the antivirus application said correction for processing of the software object comprising: upon detecting the status being changed to the inactive record, avoiding generating notifications to the user for indicating the software object is malicious and blocking subsequent transmissions of collected statistical information relating to the software object to the server; and in response to receiving from the server a notification of no change of the status of the antivirus record, transmitting information relating to the antivirus record from the computing device to the server for at least performing an antivirus check of the software object, the information including a unique identifier of the antivirus record and statistical information of the software object collected during an activation of the antivirus record.

2. The method of claim 1, wherein the unique identifier of the antivirus record is obtained from an antivirus database of the computing device.

3. The method of claim 1, wherein performing the antivirus check of the software object comprises:
comparing the received information relating to the antivirus record with information relating to known clean software objects stored in a database; and
using statistical information about software objects and associated antivirus records collected from a plurality of antivirus applications deployed on different computing devices to determine the correction of status of the antivirus record.

4. The method of claim 3, further comprising determining a record correction rule to be applied to the antivirus record based on the statistical information in determining the correction of status of the antivirus record.

5. The method of claim 4, wherein the record correction rule is activated to change a status of the antivirus record upon detecting an amount of received statistical information exceeding a selected threshold.

6. The method of claim 1, wherein the statistical information of the software object collected during the activation of the antivirus record include one or more of: a name of the software object, a hash sum of the software object, a version of the software object, and access permissions of the software object.

7. A system for malware detections, the system comprising:
a hardware process of a user's computing device configured to:
detect, by an antivirus application executing on the user's computing device, that an antivirus record is activated on the computing device for detecting a maliciousness of a software object, the antivirus record having a selected status indicator indicating at least one of: a working record, a test record, or an inactive record;
in response to detection of the antivirus record having working or test status, check, by the antivirus application, for a correction of the antivirus record with an server, wherein said correction includes a change in the status of the antivirus record;
in response to receiving from the server the correction of the antivirus record, use by the antivirus application said correction for processing of the software object comprising: upon detection of the status being changed to the inactive record, avoiding generating notifications to the user for indicating the software object is malicious and blocking subsequent transmissions of collected statistical information relating to the software object to the server; and
in response to receiving from the server a notification of no change of the status of the antivirus record, transmit information relating to the antivirus record from the computing device to the server for at least performing an antivirus check of the software object, the information including a unique identifier of the antivirus record and statistical information of the software object collected during an activation of the antivirus record.

8. The system of claim 7, wherein the unique identifier of the antivirus record is obtained from an antivirus database of the computing device.

9. The system of claim 7, wherein performing the antivirus check of the software object comprises:
comparing the received information relating to the antivirus record with information relating to known clean software objects stored in a database; and
using statistical information about software objects and associated antivirus records collected from a plurality of antivirus applications deployed on different computing devices to determine the correction of status of the antivirus record.

10. The system of claim 9, wherein a record correction rule is determined to be applied to the antivirus record based on the statistical information in determining the correction of status of the antivirus record.

11. The system of claim 10, wherein the record correction rule is activated to change a status of the antivirus record upon detecting an amount of received statistical information exceeding a selected threshold.

12. The system of claim 7, wherein the statistical information of the software object collected during the activation of the antivirus record include one or more of: a name of the software object, a hash sum of the software object, a version of the software object, and access permissions of the software object.

13. A non-transitory computer-readable storage medium comprising computer-executable instructions for malware detection on a user's computing device including instructions for:
detecting, by an antivirus application executing on the user's computing device, that an antivirus record is activated on the computing device for detecting a maliciousness of a software object, the antivirus record having a selected status indicator indicating at least one of: a working record, a test record, or an inactive record;
in response to detecting the antivirus record having working or test status, checking, by the antivirus application, for a correction of the antivirus record with an server, wherein said correction includes a change in the status of the antivirus record;
in response to receiving from the server the correction of the antivirus record, using by the antivirus application said correction for processing of the software object comprising: upon detecting the status being changed to the inactive record, avoiding generating notifications to the user for indicating the software object is malicious and blocking subsequent transmissions of collected statistical information relating to the software object to the server; and
in response to receiving from the server a notification of no change of the status of the antivirus record, transmitting information relating to the antivirus record from the computing device to the server for at least performing an antivirus check of the software object, the information including a unique identifier of the antivirus record and statistical information of the software object collected during an activation of the antivirus record.

14. The computer-readable storage medium of claim 13, wherein the unique identifier of the antivirus record is obtained from an antivirus database of the computing device.

15. The computer-readable storage medium of claim 13, wherein performing the antivirus check of the software object comprises:
  comparing the received information relating to the antivirus record with information relating to known clean software objects stored in a database; and
  using statistical information about software objects and associated antivirus records collected from a plurality of antivirus applications deployed on different computing devices to determine the correction of status of the antivirus record.

16. The computer-readable storage medium of claim 15, wherein a record correction rule is determined to be applied to the antivirus record based on the statistical information in determining the correction of status of the antivirus record, and the record correction rule is activated to change a status of the antivirus record upon detecting an amount of received statistical information exceeding a selected threshold.

17. The computer-readable storage medium of claim 13, wherein the statistical information of the software object collected during the activation of the antivirus record include one or more of: a name of the software object, a hash sum of the software object, a version of the software object, and access permissions of the software object.

* * * * *